(12) United States Patent
Hehn et al.

(10) Patent No.: US 12,327,391 B2
(45) Date of Patent: Jun. 10, 2025

(54) SYSTEM AND METHOD FOR MATCHING OF IMAGE FEATURES WITH INDISTINGUISHABLE LANDMARKS

(71) Applicant: Verity AG, Zürich (CH)

(72) Inventors: Markus Hehn, Zürich (CH); Fabio Rossetto, Zürich (CH); Luciano Beffa, Zürich (CH)

(73) Assignee: Verity AG, Zürich (CH)

( * ) Notice: Subject to any disclaimer, the term of this patent is extended or adjusted under 35 U.S.C. 154(b) by 90 days.

(21) Appl. No.: 17/768,373

(22) PCT Filed: Oct. 16, 2020

(86) PCT No.: PCT/IB2020/059746
§ 371 (c)(1),
(2) Date: Apr. 12, 2022

(87) PCT Pub. No.: WO2021/074871
PCT Pub. Date: Apr. 22, 2021

(65) Prior Publication Data
US 2024/0127576 A1    Apr. 18, 2024

Related U.S. Application Data

(60) Provisional application No. 62/915,656, filed on Oct. 16, 2019.

(51) Int. Cl.
*G06T 7/62*     (2017.01)
*G06T 5/20*     (2006.01)
(Continued)

(52) U.S. Cl.
CPC .............. *G06V 10/761* (2022.01); *G06T 5/20* (2013.01); *G06T 7/50* (2017.01); *G06T 7/62* (2017.01);
(Continued)

(58) Field of Classification Search
CPC .... G06V 10/761; G06V 10/44; G06V 10/764; G06T 7/62; G06T 7/50; G06T 7/73; G06T 5/20
See application file for complete search history.

(56) References Cited

U.S. PATENT DOCUMENTS 9,286,810 B2    3/2016  Eade et al.
2007/0179377 A1  8/2007  Carlsen et al.
(Continued)

FOREIGN PATENT DOCUMENTS

| | | |
|---|---|---|
| CN | 109724603 A | 5/2019 |
| EP | 1657679 A1 | 5/2006 |
| EP | 3451288 A1 | 3/2019 |

OTHER PUBLICATIONS

International Search Report and Written Opinion for PCT/IB2020/059746, dated Jan. 15, 2021, 11 pages.
(Continued)

*Primary Examiner* — Syed Haider
(74) *Attorney, Agent, or Firm* — Blank Rome LLP

(57) ABSTRACT

According to the present invention there is provide a method a method for matching features in an image with landmark representations in a landmark map, the method comprising: providing at least one image; extracting from the image one or more features; providing a landmark map comprising a list of landmark representations, wherein each landmark representation is a representation of a respective physical landmark; creating a plurality of policies, each policy comprising at least one matching decision of the feature and the landmark representation, each matching decision having a stage cost; assigning a policy cost to each of the policies, wherein the policy cost is a function of the stage costs of the matching decisions the policy is comprised of; selecting from the collection of the policies the policy with the desired policy cost. There is further provided an assembly having a processor which is configured to carry out said method.

26 Claims, 5 Drawing Sheets

(51) Int. Cl.
*G06T 7/50* (2017.01)
*G06T 7/73* (2017.01)
*G06V 10/44* (2022.01)
*G06V 10/74* (2022.01)
*G06V 10/764* (2022.01)

(52) U.S. Cl.
CPC ............... *G06T 7/73* (2017.01); *G06V 10/44* (2022.01); *G06V 10/764* (2022.01)

(56) References Cited

U.S. PATENT DOCUMENTS

| | | | | |
|---|---|---|---|---|
| 2010/0070125 | A1* | 3/2010 | Lee | G05D 1/0253 |
| | | | | 701/28 |
| 2012/0121161 | A1* | 5/2012 | Eade | G06F 16/444 |
| | | | | 901/1 |
| 2012/0213443 | A1 | 8/2012 | Shin et al. | |
| 2014/0235267 | A1* | 8/2014 | Song | G06T 7/74 |
| | | | | 455/456.1 |
| 2018/0253107 | A1* | 9/2018 | Heinla | G05D 1/0223 |
| 2020/0334842 | A1* | 10/2020 | Michielin | G06T 15/10 |

OTHER PUBLICATIONS

B. Coltin, et al., "Localization from Visual Landmarks on a Free-Flying Robot", IEEE/RSJ International Conference on Intelligent Robots and Systems (IROS), Daejeon Convention Center, Oct. 9-14, 2016, Daejeon, Korea, 6 pgs.
Chinese Office Action for Application No. 202080071473.4 mailed Feb. 19, 2025, 11 pages.

\* cited by examiner

SYSTEM AND METHOD FOR MATCHING OF IMAGE FEATURES WITH INDISTINGUISHABLE LANDMARKS

RELATED APPLICATIONS

This application is a national phase of PCT/IB2020/059746, filed on Oct. 16, 2020, which claims priority to U.S. Provisional Application No. 62/915,656, filed on Oct. 16, 2019. The contents of these applications are hereby incorporated by reference in their entirety.

FIELD OF INVENTION

The present invention generally relates to optical indoor localization and similar methods and systems. Specifically, the present disclosure describes a system and method for matching physical landmarks with features in an image taken with camera.

BACKGROUND

One of the biggest challenges of localizing indoors is that unlike the outdoor spaces, GNSS (Global Navigation Satellite Systems) is not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

The example of indoor localization system in the prior art is optical system. The optical localization system extracts information from camera images. The location of the object of which the position and orientation (often referred as the pose) is to be determined can then be computed using triangulation techniques after relating the coordinates of features in the two-dimensional camera image to a three-dimensional ray on which the landmark lies. The relation between image coordinates and three-dimensional ray is typically captured in a combination of first-principle camera models (such as pinhole or fisheye camera models) and calibrated distortion models (typically capturing lens characteristics, mounting tolerances, and other deviations from the first-principle model).

In the optical localization system, the camera can be rigidly mounted outside the object and observing the motion of the object ("outside-in tracking"), or the camera can be mounted on the object itself observing the apparent motion of the environment ("inside-out tracking"). While outside-in tracking localization systems typically determine the location of the object relative to the known locations of the cameras, inside-out tracking systems like SLAM (Simultaneous Localization And Mapping) typically generate a map of landmarks. The map is expressed in an unknown coordinate system unless the location of some of the landmarks are known or if the initial pose of the camera is known. In both cases, some error will accumulate as the map is expanded away from the initial field of view of the camera or from the landmarks with known location. The potential for propagating errors is a problem for applications where the location information must be referred to external information, for example to display the location of the object in a predefined map, to relate it to the location of another such object, or when the location is used to guide the object to a location known in an external coordinate system.

A significant challenge of optical systems is the extraction of information from the camera image for tracking purposes. For outside-in systems, this entails recognizing the object to be tracked in the image. In inside-out systems, it typically entails extracting "good" landmarks and recognizing them in consecutive images (for example, using scale-invariant feature transform (SIFT) to detect and annotate features). This is complicated by illuminance routinely varying by many orders of magnitude and the reflectivity of surfaces additionally varying by orders of magnitude. For example, full daylight is about 10,000 lux while full moon is only 0.1 lux. In contrast to this, a single-exposure image taken by an image sensor typically only has 2-3 orders of magnitude of dynamic range (e.g. a 10-bit sensor providing 1024 discrete measurement steps of incident light). This makes it difficult to correctly configure the image sensor sensitivity and exposure time, and additionally makes it difficult to recognize landmarks from image to image (especially when camera settings change between images). This severely limits the robustness of optical systems in difficult lighting conditions.

In some instances, optical localization systems reduce the impact of varying lighting conditions by adding high-contrast landmarks (that is, areas of differing reflectance) to the scene. In the case of outside-in systems this is often combined with strobes in the form of (retro-)reflectors attached to the tracked object; in the case of inside-out systems this often takes the form of high-contrast wall decorations, carpets, etc.

Existing photogrammetric approaches rely on feature extraction to assign certain descriptors (e.g. SIFT descriptor) to each feature, in addition to the position of the feature on the sensor, that allow matching the features in different images by comparing these descriptors using feature matching. It should be noted that a "feature" in an image is a "projection of landmark". Feature matching, also referred to as the correspondence problem, is the process of matching features over different images. The goal of feature matching is to assign, in a plurality of different images, the same landmark identifiers to features that are the projection of the same landmark, and to assign differing landmark identifiers to features in said plurality of different images that are the projection of different landmarks.

However, the approach explained above cannot be used when the landmarks in question are similar looking or identical to one another; when the landmarks in question are similar looking or identical to one another then projection of these landmarks (i.e. the "features") which appear in different image are indistinguishable (landmarks have very similar physical properties, such as shape, size, color, or reflectivity) accordingly features in a plurality of images, which are actually projections of different landmarks, may erroneously be assigned the same identifiers. Furthermore descriptors which are assigned to features in a plurality of image are a function of the appearance of the feature in the images; since the appearance of features, which are the projection of similar or identical landmarks, in the image are indistinguishable, some descriptors which are assigned to different features in the plurality of images are indistinguishable; in other words descriptors which are assigned to different features (i.e. features which are the projection of different landmarks) are similar or identical; accordingly, the descriptors which are assigned to features in the plurality of images are not sufficiently different from each other to enable identify which landmark each feature is a projection of.

In this situation, the ability to distinguish landmarks based on feature descriptors is extremely limited; and as a result, with existing photogrammetric techniques it is not possible to achieve sufficiently accurate feature matching.

The present invention aims to mitigate one or more of the disadvantages associated with indoor localization systems.

SUMMARY OF INVENTION

According to the present invention there is provided a method having the steps recited in the claims. There is further provided an assembly having a processor which can carry out the method recited in the claims. The dependent claims outline favorable, non-essential, features of the invention.

BRIEF DESCRIPTION OF DRAWINGS

Exemplary embodiments of the present invention will be described, with reference to the following drawings, in which.

DETAILED DESCRIPTION

Figure 1:
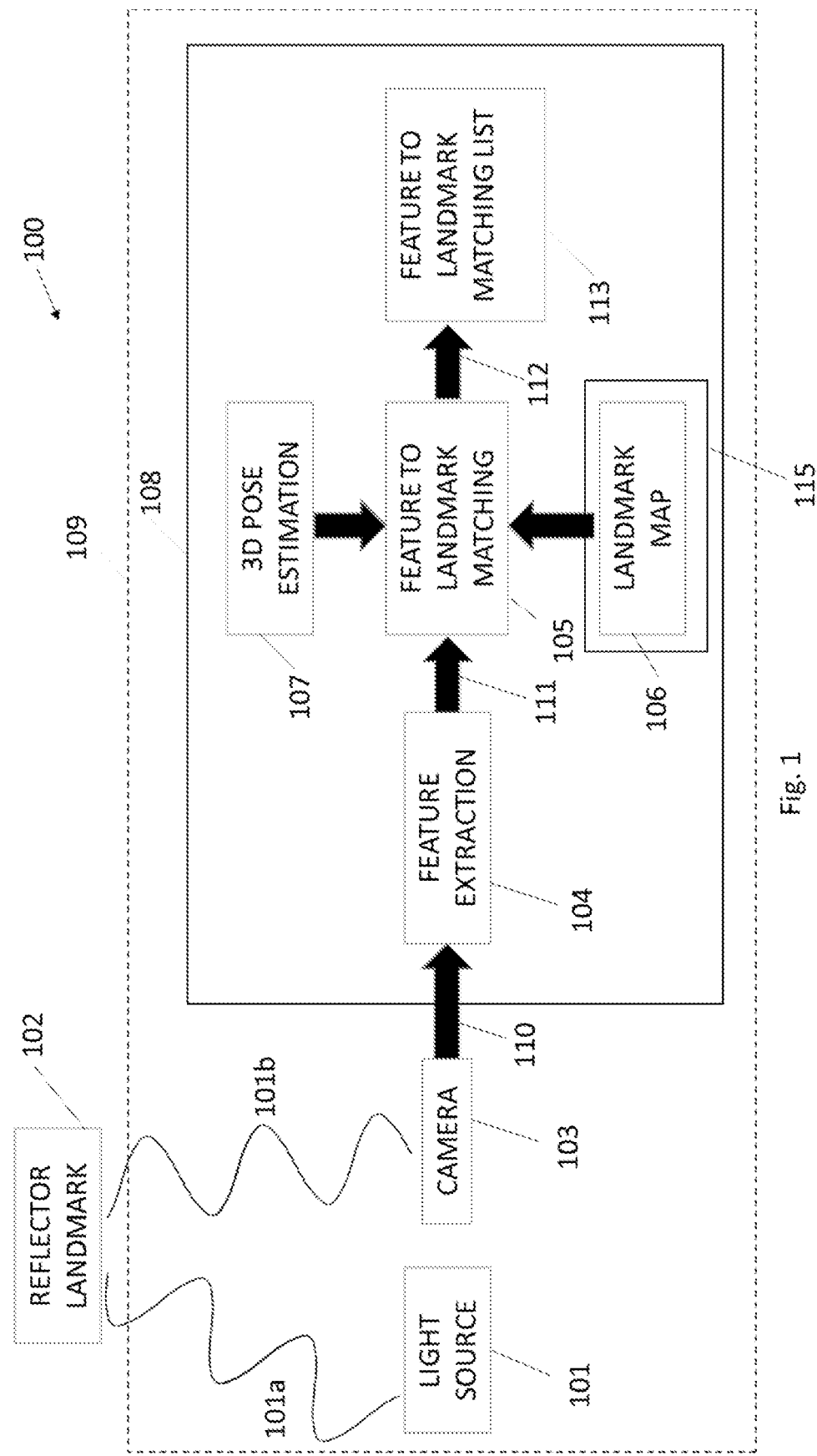
FIG. 1 illustrates representation of an assembly according to an embodiment of the present invention.

What follows in this section are definitions of terms which are used in this application.

An image is comprised of at least one or more of pixel intensities, each corresponding to one or multiple of the one or more pixels. Said one or more pixel intensities are typically ordered in an array wherein each element of the array corresponds to the location of the corresponding pixel of an image sensor. The location is typically expressed by a two-dimensional position in the pixel coordinate frame. Typically, the origin of the pixel coordinate frame is at a corner of the image sensor, with the two axes pointing along the edges of the image sensor. The coordinates in the pixel coordinate frame can be expressed in pixel counts or in distance.

A camera is a sensor system that at least captures and outputs one or more frames or a series of frames and comprises at least an image sensor, wherein an image sensor is a sensor that captures and outputs images and comprises one or more pixels. Typically, the one or more pixels are arranged on a planar grid (typically rectangular). The camera may further comprise a mechanical shutter to control exposure.

In some embodiments, the camera further comprises one or more optics to alter the frequency spectrum or direction of incoming light. For example, a lens may be used to focus light onto the image sensor, a filter may be used to reduce transmission of light with certain wavelengths to the image sensor, a mirror may be used to deflect light onto or away from the image sensor. The optics may affect all pixels (e.g. a lens) or individual pixels (e.g. a Bayer array).

In some embodiments, the camera further comprises control circuitry connected to the image sensor to adjust settings related to taking images that may include some or all of exposure time, gain, arrangement of optics, aperture size, etc. In some embodiments, said control circuitry is also configured to read the pixel intensities from the image sensor and to combine the pixel intensities to images. In some embodiments, said control circuitry further processes the images by adjusting the pixel intensities according to a predefined rule (e.g. to achieve better white balance).

In some embodiments, the exposure time of the image sensor can be set by sending a signal to the image sensor and/or mechanical shutter. In some embodiments, the exposure time is fixed and set before operation.

In some embodiments, the camera further comprises optics that are selected or designed such that projected landmarks are more easily distinguishable from other features. For example, if landmarks are known or designed to emit or reflect (or otherwise generate or redirect) light with a specific frequency or in a specific band of frequencies, the camera may be outfitted with a band-pass filter whose passband is selected to include at least part of the frequency of said emitted light such that said light appears significantly brighter in the image than light generated or redirected by other light sources.

A pixel measures the amount of incident light arriving at said pixel and comprises at least a photosensitive material and electric circuitry, wherein the photosensitive material produces an electric signal if excited by incident light, and wherein said electric signal may then be converted to a pixel intensity.

A frame is comprised of at least an image. In some embodiments, the frame further comprises image meta information together with the image. For example, image meta information may include camera settings (such as exposure time, conversion gain, or applied corrections), or a timestamp of when the image was taken (or more precisely, when exposure has started and/or ended). The frame rate is the frequency at which a camera captures and outputs consecutive frames.

A pixel intensity is a value indicative of the amount of light that has arrived at a pixel in a given amount of time, herein referred to as the exposure time.

The collection of directions from which light can arrive at a pixel will hereafter be referred to as light cone. In some embodiments, a light cone may be associated with a single direction computed from said collection of directions, for example by taking the average of said collection of directions.

The frame rate is the frequency at which a camera captures and outputs consecutive frames.

An image sensor is a sensor that captures and outputs images and comprises one or more pixels.

Some example image sensors include those that are based on metal-oxide-semiconductor (MOS) technology, including the charge-coupled device (CCD) and the active pixel sensor (CMOS sensor), in complementary MOS (CMOS) or N-type MOS (NMOS or Live MOS) technologies.

Typically (for rectangular image sensors), the placement and number of the one or more pixels is described by the resolution: An example resolution is W×H where W is an integer describing the number of pixels along one side of the rectangular sensor and H is an integer describing the number of pixels along the other side of the rectangular sensor.

An angle of arrival (AoA) is at least one value describing the direction at which light arrives relative to an object. In some embodiments, the AoA comprises two angles, e.g.

azimuth and elevation with respect to the object. In some embodiments, the direction of a light cone may be expressed by an AoA instead of the direction of the light cone, in which case the location of the pixel corresponding to said light cone may be associated with said AoA and the pixel value corresponding to said pixel is a measure of the amount of light arriving from said AoA.

Camera calibration parameters is a set of mappings, values and/or models describing properties of the camera, including at least a camera model. In some embodiments the camera calibration parameters further include an undistortion mapping. In some embodiments camera calibration parameters may further include the resolution of the image sensor. In some embodiments, the camera calibration parameters further include the pose of the camera coordinate system with respect to another coordinate system fixed to the localizing apparatus.

A camera model is a set of mappings, values and/or equations describing the relation between the location of a pixel in the image to the direction or collection of directions of its corresponding light cone. In some embodiments, the camera model is a mapping storing for each pixel location a corresponding direction of the light cone corresponding to said pixel location. In some embodiments, the camera model is a set of equations describing a mapping from a direction of incoming light to a pixel location and/or from a pixel location to a direction of incoming light. Typically, said set of equations and values contains at least coordinates of the principal point and the focal length of the camera. A camera model may for example be determined by any well-known means of camera calibration.

An undistortion mapping is a set of values and/or equations determined to compensate for nonidealities (e.g. optical aberration such as defocus, distortion, chromatic aberration, etc.) of the image sensor or optics (if applicable).

A localizing apparatus is an assembly comprising at least a camera. In some embodiments the localizing apparatus further comprises a processor, a light source, and/or additional sensors.

A feature is a point or area of an image that satisfies one or more properties which make it recognizable. Some examples of such properties include the color, brightness, shape, other similar characteristics, or combinations thereof. In some embodiments said one or more properties make the feature highly distinctive relative to a neighborhood surrounding the feature. For example, a bright area (i.e. an area of high pixel intensity) on an image may be surrounded by a neighborhood of low pixel intensity, and the bright area is therefore recognizable as a feature.

A feature description comprises at least the position of the feature within the image. In some embodiments, the feature description further comprises a descriptor.

A descriptor is a collection of parameters describing the appearance of a feature. Thus, a descriptor may comprise any information about a feature except its position within the image. Specific examples of descriptors include
  the area, shape or color of the feature
  a generic, geometric descriptor of the feature, as for example the SIFT descriptor, the MOPS descriptor or the GLOH descriptor
  a message, code, or similar information encoded in the feature, as for example the message encoded in a QR code
  a semantic classification of the feature, i.e. whether it is the projection of a chair, a car or a table
In the present disclosure the terms feature descriptor and descriptor are used interchangeably.

A landmark is a point, object, or surface in space that can be recognized as a feature in at least some of the images taken of said landmark. In some embodiments, the landmark reflects light, in which case the landmark is referred to as reflector landmark. In some embodiments, the landmark emits light, in which case the landmark is referred to as active landmark.

Reflector landmarks are preferably placed at fixed locations within the environment and illuminated by one or more light sources.

In some embodiments, the reflector landmark is retro-reflective causing the reflection of light received from a light source to be reflected back to said light source in a concentrated fashion. Retroreflectors commonly consist of glass beads or cube corner microprisms. A retroreflector is typically characterized by its coefficient of retroreflection, which may be specified as a function of the angle of incident light relative to the surface of the retroreflector and/or the angle between light source and camera. If a camera is placed close to said light source, said retro-reflective surface of the reflector landmark will appear significantly brighter on the image than reflections from diffuse reflectors at the same distance.

In some embodiments, the shape of the reflector landmark is such that the appearance of its projection on an image collected by a camera is the same regardless of the relative orientation between said reflector and said camera. In some embodiments, the shape of the reflector landmark is such that the area of projection of said reflector landmark on an image collected by a camera is the same regardless of the relative orientation between said reflector landmark and said camera. In some embodiments, the shape of the retroreflector is such that the area or shape of the retroreflector varies with the relative orientation between said reflector landmark and said camera.

In some embodiments the landmarks, are active landmarks; an active landmark is a landmark which is configured to emit light when a predefined condition has been satisfied (or in response to receiving a predefined stimulus). For example in one implementation, an active landmark may include a photosensor, control circuitry, and a light source; the photosensor detects the amount of light which is incident on the active landmark (preferable the light which is incident on the photosensor is light which is emitted from a light source which is on the localizing apparatus); if the amount of light which is incident on the active landmark is above a predefined threshold level (i.e. the 'predefined condition), then the control circuitry controls the light source of the active landmark to emit light. The light source may be configured to emit light which has predefined properties e.g. light having a predefined wavelength, or light which is within a predefined wavelength range (e.g. Infrared light); advantageously this allows to distinguish light emitted by the light source on the active landmark from light coming from other light sources.

A landmark representation is a description of a landmark, comprising at least an estimate of the position of the landmark. In some embodiments said landmark representation is a 3D position of the landmark expressed in the external coordinate frame. In some embodiments, said 3D position is the center of mass of the landmark. In some embodiments, the landmark representation may include further information such as
  Uncertainty metric in the estimate of the position of the landmark, such as a covariance matrix;
  one or more descriptions of the shape of the landmark;
  size or dimensions of the landmark;

orientation of the landmark;
uncertainty metric of the orientation of the landmark, such as a covariance matrix;
reflective properties such as reflectivity of the landmark, wherein the reflectivity may be further expressed as a function of the angle of arrival, the intensity, and/or the spectral power distribution of the incident light;
a list of distinctive 3D positions of the landmark (such as corners of the landmark if applicable),
one or more semantic classification of the landmark, i.e. whether it is a chair, a car or a table, or
combinations of the above A landmark identifier is a symbol or value uniquely identifying a landmark representation. In some embodiments said landmark identifier is an integer number. A landmark identifier may be assigned to a feature, indicating that said feature is believed to be a projection of the landmark associated with the landmark representation identified by said landmark identifier.

A landmark map is a list of one or more landmark representations. In some embodiments, the landmark map further contains for at least one of the one or more landmark representations a corresponding landmark identifier.

A light source is a system or device that receives input energy and that emits light, wherein light refers to any electromagnetic radiation. In a preferred embodiment, a measurable amount of the energy of the emitted light is emitted within the frequency spectrum of ultra-violet, visible and infra-red light. Examples of light sources include incandescent light bulbs, halogen lamps, light-emitting diodes (LEDs), fluorescent lamps (compact fluorescent lights, fluorescent tube lights), gas discharge lamps, flames, lasers, chemo-luminescent materials, fluorescent materials, and phosphorescent materials (such as e.g. zinc sulphide or strontium aluminate).

In some embodiments the light source is powered by any of a battery, external electrical power supply, gas, fuel, solar cell, or other power sources or combinations thereof.

In some embodiments, the light source further comprises control circuitry configured to change the intensity and/or frequency of the light emitted by the light source over time. In some embodiments, said control circuitry is further configured to receive signals indicating the target intensity of the light emitted by the light source. In some embodiments, said control circuitry is further connected to a clock allowing the control circuitry to control the intensity of the light emitted by the light source according to a preprogramed schedule. In some embodiments, said clock is synchronized with other clocks.

Light sources may emit light in all directions (omnidirectionally), or only in certain directions. The directional properties of a light source are described by its radiation pattern, which describes the intensity of light emitted in different directions. In the present disclosure, the term light source and strobe may be used interchangeably.

A feature extraction module is a module that takes as input at least one frame. The module identifies, within at least one image contained in the at least one frame, features and their respective positions in the at least one image (in some embodiments, the module further determines their respective descriptors). The module outputs for each image within which it identified features a list of feature descriptions.

In some embodiments, the feature extraction module is configured to identify features in the image without any prior knowledge of the properties of landmarks (such as size, dimensions, orientation, etc.). In said embodiment, the feature extraction module is configured to select features in the image frame which have certain predefined properties. Preferably, the predefined property is for the feature to have a large gradient of brightness in two orthogonal directions.

In some embodiments, the feature extraction module is configured to identify features in the image having prior knowledge of the appearance of landmarks (such as size, dimensions, orientation, etc.). In said embodiment, the feature extraction module identifies features in the image that match the appearance of landmark, for example, the extraction of fiducials such as QR codes.

A feature-to-landmark match comprises at least a feature description and a landmark representation. A feature-to-landmark match represents the belief that the feature described by the feature description contained in the feature-to-landmark match is a projection of the landmark described by the landmark representation contained in the feature-to-landmark match. In some embodiments, the feature-to-landmark match comprises a landmark identifier instead of a landmark representation.

In the present disclosure, a feature-to-landmark match is said to be a 'true feature-to-landmark match' or 'true match', if the feature described by the feature description contained in the feature-to-landmark match is indeed a projection of the landmark described the landmark representation contained in the feature-to-landmark match. Conversely, if the feature described by the feature description contained in the feature-to-landmark match is not a projection of the landmark described the landmark representation contained in the feature-to-landmark match, then the feature-to-landmark match is said to be a 'false feature-to-landmark match' or 'false match'.

In some embodiments, the feature-to-landmark match may include further information such as an indicator whether a feature description or a landmark representation was successfully matched (i.e. it was successfully determined that the feature described by the feature description is a projection of the landmark described by landmark representation) or whether the feature-to-landmark match is assumed to be a true match or false match with high certainty. It should be understood that the same information may be conveyed implicitly by forming a feature-to-landmark match that only contains a feature description and an empty or invalid landmark representation, or by forming a feature-to-landmark match that only contains a landmark representation and an empty or invalid feature description. In some embodiments, said indicator is not binary but a number representing the likelihood of the feature-to-landmark match being a true (or false) match.

A feature-to-landmark matching module is a module that takes as input a list of feature descriptions and a landmark map. The module:
identifies which features are projections of landmarks in the landmark map, and which are not. The features that are projections of landmarks in the landmark map are called inlier features, while the features that are not projections of landmarks in the landmark map are called outlier features
for the inlier features, identifies of which landmark of the landmark map each inlier feature is the projection of.

The two operations may be performed as separate steps or simultaneously. The output of the feature-to-landmark matching module is at least a list of feature-to-landmark matches, wherein the list of feature-to-landmark matches is formed as follows:
for each inlier feature: a feature-to-landmark match is formed from the landmark representation (or landmark identifier) of the landmark (of the landmark map)

which was identified to be the projection of said inlier feature and the feature description of said inlier feature.

The list of feature-to-landmark matches is formed from the resulting one or more feature-to-landmark matches for each inlier feature In some embodiments, the feature-to-landmark module outputs an augmented list of feature-to-landmark matches, which contains, in addition the feature-to-landmark matches of the inlier features, for each outlier feature: a feature-to-landmark match having the feature description of the outlier feature and an empty or invalid landmark representation.

In some embodiments, the feature-to-landmark matching module further receives one or more estimates of the 3D pose of the localizing apparatus. Said one or more estimates of the 3D pose may be used as one or more priors to simplify the two operations that the feature-to-landmark matching module carries out to create the list of feature-to-landmark matches.

A 3D pose estimation module is a module that takes as input a list of feature-to-landmark matches. The module performs a computation that determines an estimate of at least the position or orientation of the localizing apparatus with respect to an external coordinate system. In a preferred embodiment, the module determines an estimate of the 3D pose with respect to an external coordinate system. The output of the 3D pose estimation module is at least the estimate of the position or orientation of the localizing apparatus (or a at least the 3D pose estimate of the localizing apparatus in said preferred embodiment).

In some embodiments, specifically if the list of feature-to-landmark matches contains feature-to-landmark matches that contain landmark identifiers instead of landmark representations, the 3D pose estimation module requires the same landmark map provided to the feature-to-landmark matching module to perform its computations because the 3D pose estimation requires the landmark representations that are identified by the landmark identifiers.

A 3D pose comprises 6 degrees of freedom describing a 3D position and 3D orientation. The terms '3D pose' and 'pose' will be used interchangeably hereafter.

A processor is a device or electronic circuit that is capable to carry out operations required by the feature extraction module, feature-to-landmark matching module, and the 3D pose estimation module. In some embodiments the processer may further comprise at least one memory, which may temporarily or persistently store information relevant to carry out operations on the processor. For example, the memory may store (predefined) parameters such as one or more camera calibrations and/or one or more landmark maps.

Additional sensor data refers to data provided by any of the group of limit switches, air pressure sensors, accelerometers, gyroscopes, magnetometers, optical flow sensors, encoders, photodetectors, laser or sonar range finders, radar, thermometers, hygrometers, bumpers, chemical sensors, electromagnetic sensors, air flow sensors and relative airspeed sensors, ultra sound sensors, microphones, radio sensors, and time-of-flight sensors.

DETAILED DESCRIPTION OF DRAWINGS

FIG. 1 is an illustrative representation of an assembly 100 according to an example embodiment of the present invention. The assembly 100 comprises at least one light source 101; at least one reflector landmark 102; a camera 103; a feature extraction module 104; a feature-to-landmark matching module 105; a landmark map 106; a 3D pose estimation module 107; and a processor 108.

The localizing apparatus 109 comprises the processor 108, the at least one light source 101, and the camera 103.

The at least one light source 101 emits light 101a. In this embodiment the light source 101 is preferably physically attached to camera 103.

The at least one reflector landmark 102 is configured to reflect light 101a. Thus, returning reflected light 101b to the camera 103. In another embodiment, the at least one reflector landmark 102 may be at least one active landmark wherein an active landmark is a landmark that emits light.

In another embodiment, the at least one reflector landmark 102 may be at least one active reflector landmark wherein an active reflector landmark is an active landmark that emits light in response to a predefined stimulus (for example the active landmarks may emit light which has a predefined property (e.g. a predefined wavelength) in response to receiving light from the light source 101).

The camera 103 captures one or more frames wherein each captured frame comprises at least an image, wherein said image is formed by reading out one or more pixel intensities measured by the corresponding one or more pixels during a predefined exposure time, wherein the pixels are exposed to the reflected light 101b reflected by the reflector landmark 102. The camera 103 outputs the one or more frames 110.

The feature extraction module 104 is operably connected to the camera 103 and receives one or more frames 110 from the camera 103. The feature extraction module 104 outputs for each of the one or more frames 110 which it receives from the camera 103, one or more lists of feature descriptions 111.

The landmark map 106 is a list of one or more landmark representations; most preferably the landmark map 106 is stored in a memory 115 of the assembly 100 (the memory 115 may be part of the processor 108; in other words the processor 108 may comprise the memory 115). The landmark map 106 of a given environment may for example be obtained with SLAM or photogrammetry, however, it is also possible to take the opposite approach of designing a landmark map, and then shaping the environment according to the map. The method of creating a landmark map 106 is preferably executed prior to operating the assembly 100.

The feature-to-landmark matching module 105 is operably connected to the memory 115 containing the landmark map 106, the feature extraction module 104 and the 3D pose estimation module 107. The feature-to-landmark matching module 105 receives the landmark map 106 from the memory 115, the one or more lists of feature descriptions 111 from the feature extraction module 104, and one or more estimates of the 3D pose from the 3D pose estimation module 107. The feature-to-landmark module 105 computes for each list of the one or more lists of feature descriptions 111 a list of feature-to-landmark matches 112 and outputs the resulting one or more lists of feature-to-landmark matches 113.

The 3D pose estimation module 107 is operably connected to the feature-to-landmark matching module 105.

The processor 108 comprises the feature extraction module 104, feature-to-landmark matching module 105, and the 3D pose estimation module 107. It should be understood that the system could alternatively comprise a plurality of processors and the modules may be distributed among said plurality of processors (e.g. the system may comprise a first processor which comprise the feature extraction module; a second processor which comprises feature-to-landmark matching module; and a third processor which comprises the module which can estimate the pose of said camera). Importantly, the processor 108 may be configured to carry out a method of matching features with landmarks according to the present invention; said method will be described in more detail below. The method may also be carried out by a processor, including but not limited to another computing device such as a smart phone, which is separate from the localizing apparatus.

Figure 2:
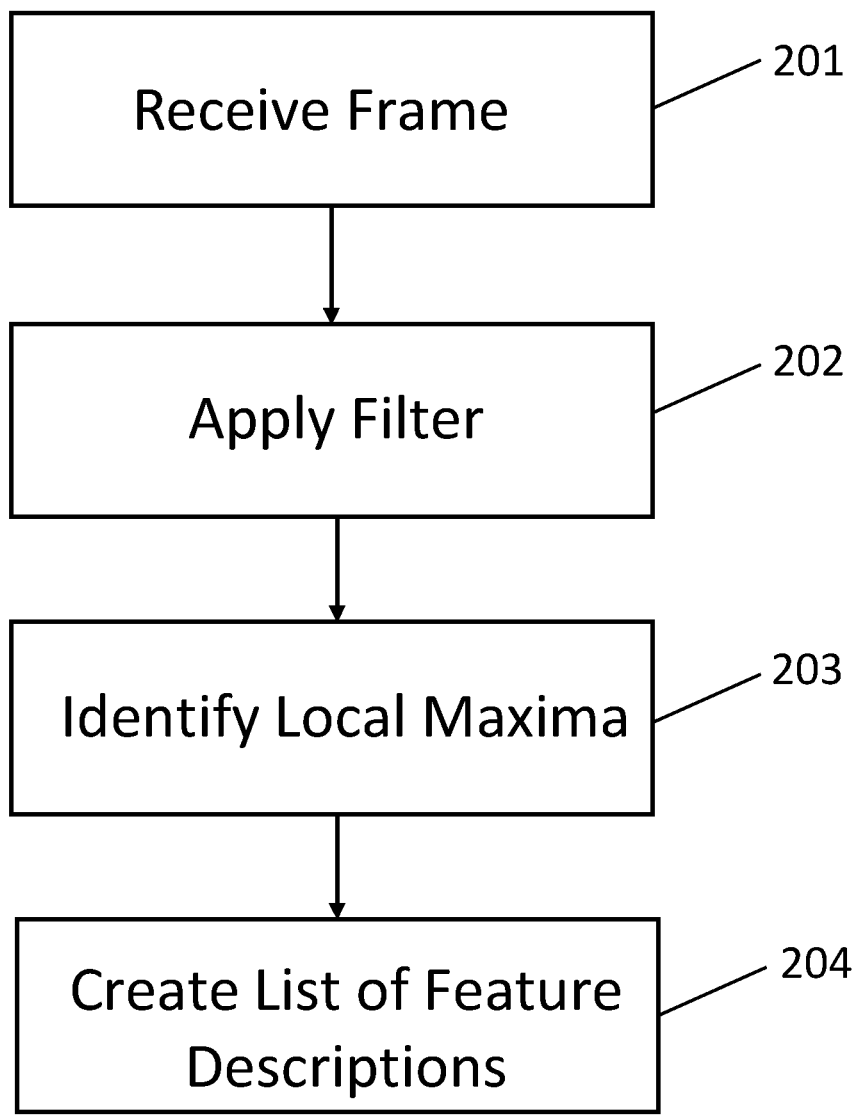
FIG. 2 is a flow chart illustrating the exemplary steps performed by the feature extraction module.

During the operation of the assembly 100 the following exemplary method may be carried out to determine the location of the localizing apparatus 109:

1. The light source 101 emits light 101*a*;
2. The emitted light 101*a* arrives fully or partially at one or more reflector landmarks 102;
3. The reflector landmark(s) 102 reflects the light 101*a* fully or partially, giving rise to the reflected light 101*b*;
4. The reflected light 101*b* arrives fully or partially at the camera 103;
5. The camera 103 captures an image of the scene containing the one or more reflector landmarks 102 (the reflected light 101*b* being used to generate the image). Pixels of the image sensor of the camera 103 that were exposed to the reflected light 101*b* will have associated a higher pixel intensity (and thus appear brighter) in the image. The image is stored in a frame. The camera may capture multiple images and store them in one or more frames. The one or more frames 110 are forwarded to the feature extraction module 104,
6. The feature extraction module 104 receives the one or more frames 110 and creates a list of feature descriptions 111 for each of the one or more frames 110 by any suitable means, (e.g. as illustrated in FIG. 2 as will be described in more detail below). The resulting one or more lists of feature descriptions 111 are forwarded to the feature-to-landmark matching module 105.
7. The feature-to-landmark matching module 105 receives the one or more lists of feature descriptions 111, retrieves the landmark map 106 and receives the one or more estimates of the 3D pose of the localizing apparatus 109. If the 3D pose estimation module has not yet computed one or more estimates of the 3D pose of the localizing apparatus 109, the feature-to-landmark matching module 105 instead uses one or more predefined initial guesses of the 3D pose of the localizing apparatus. The feature-to-landmark matching module creates a feature-to-landmark matching list 113. The feature-to-landmark matching list 113 may be forwarded to the 3D pose estimation module 107 (not shown in FIG. 1).
8. The 3D pose estimation module 107 may use the feature-to-landmark matching list to compute a new estimate of the 3D pose of the localizing apparatus 109.

It should be understood that above process may be repeated multiple times, especially if the localizing apparatus is moving, it may be beneficial to run above process repeatedly. In some embodiments, the history of estimates of the 3D pose of the localizing apparatus may be of interest, in which case the above process must be executed multiple times.

FIG. 2 illustrates an exemplary method how the feature extraction module 104 can create a list of feature descriptions 111 for each of the one or more frames 110; the method comprises the following steps:

1. In step 201, the feature extraction module 104 receives a frame 110 which has been captured by the camera 103.
2. In step 202, the feature extraction module 104 applies a filter to the image contained in the frame, resulting in a filtered image. The filter may be a band-pass filter, a thresholding filter or a high pass filter for examples. It should be noted that this step is optional and may be used to improve image quality (wherein image quality may for example be measured by how accurately the position of the feature may be determined in step 203) for subsequent steps. For example, step 202 may reduce image sensor noise, lower high pixel intensities caused by ambient light, or smoothen the image. The filter may be predefined or adapting based on e.g. the sum of the pixel intensities of the image.
3. In step 203, the feature extraction module 104 identifies local maxima in pixel intensity in the filtered image. The position in the image of the local maxima is identified by the feature extraction module 104 as being the position of a feature within the image.
4. In step 204, the feature extraction module then creates a list of feature descriptions wherein each feature description contains at least the position of the feature in the image.

In step 203, local maxima in pixel intensity may for example be identified by a search using gradient ascent: Starting at every point in the image, move along the gradient until the gradient has zero magnitude, this point is either a local minimum or a local maximum. Discard points that have low pixel intensity as local minima.

In yet another embodiment, prior to carrying out step 204, the feature extraction module 104 may, optionally, further carry out a step of selecting a predefined area around of each local maximum and use said area to create a respective feature description, e.g. a vector which comprises information on the appearance of the neighbourhood surrounding the local maximum. Alternatively, the feature extraction module may identify, for each local maximum, the region of surrounding pixels that all have a common predefined property and use said region to create a respective feature description; for example the feature extraction module may derive a description of said region of surrounding pixels that all have a common predefined property by computing relevant geometrical properties, such as the area of the region, the perimeter of the region, or the principal components of the region.

In the system described above, a match between features and featureless landmarks is desired to allow the system to function properly. The matching of features with indistinguishable landmarks finds the most likely match between features and indistinguishable landmarks given a prior estimate of the pose without relying on feature descriptors. That is, the invention can identify a match between features and landmarks even with a minimal description of both, limited to their two-dimensional and three-dimensional position respectively.

Figure 3:
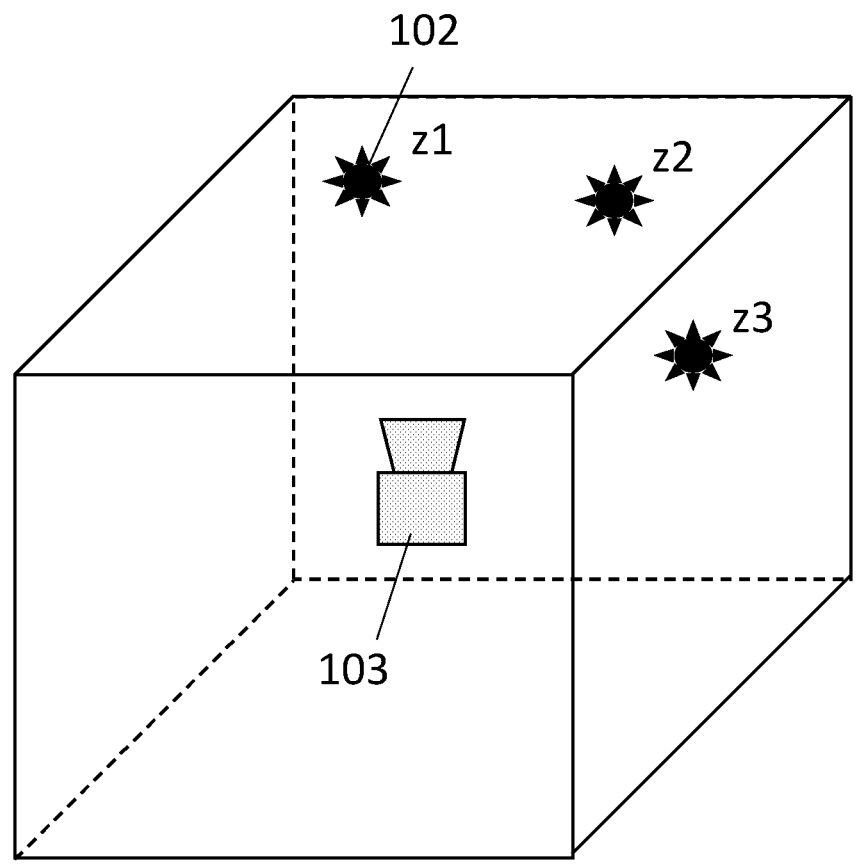
FIG. 3 illustrates representation of camera system and physical landmarks in 3D space.
Figure 4:
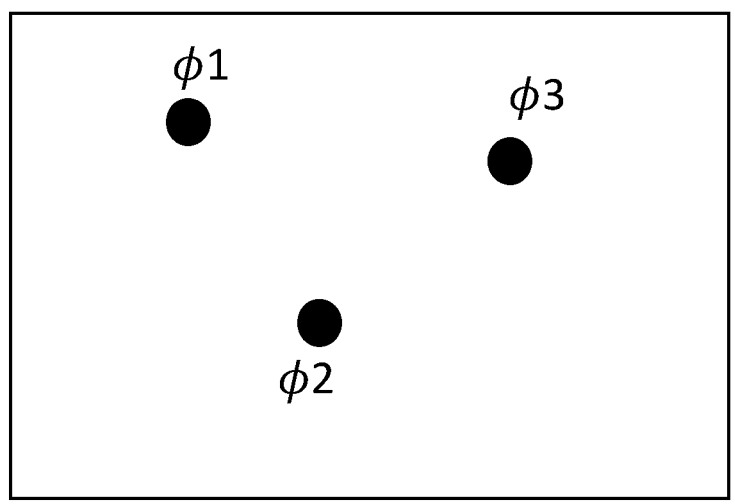
FIG. 4 illustrates representation of image taken with camera and features identified in the image.
Figure 5:
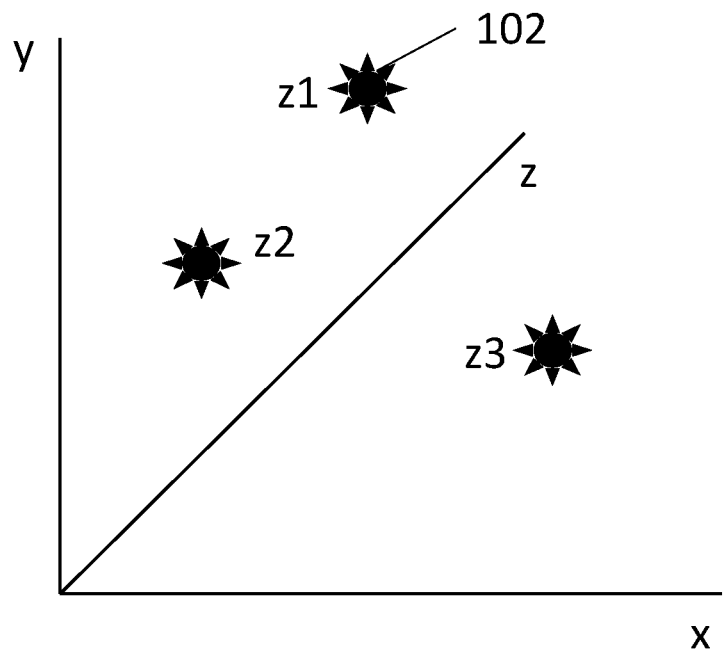
FIG. 5 illustrates representation of positions of landmarks in 3D space.
Figure 6:
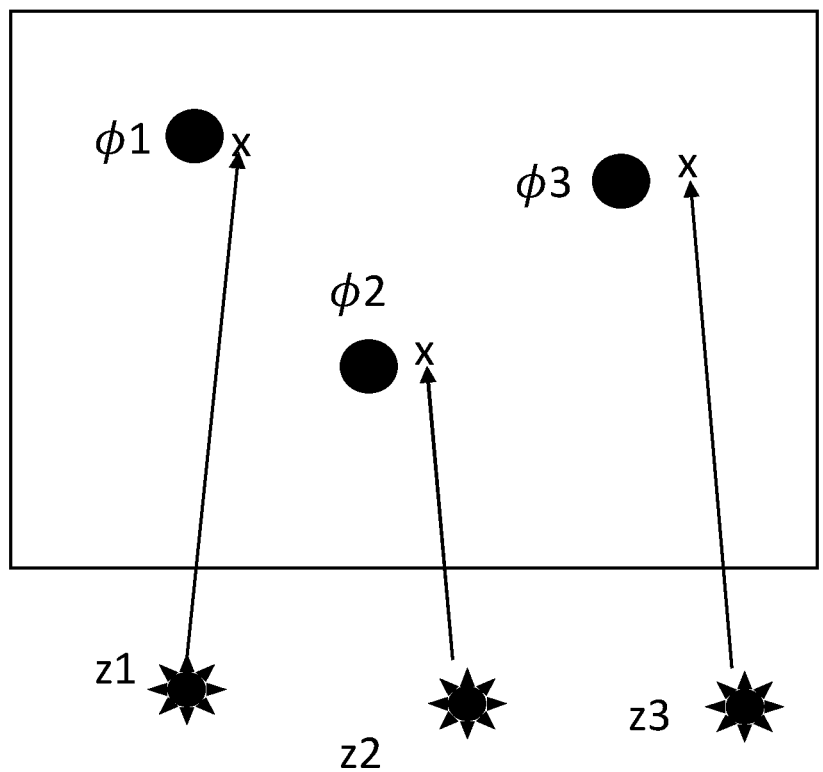
FIG. 6 illustrates projections of the landmarks onto the image taken with camera.

FIG. 3 shows an example of the configuration comprising indistinguishable landmarks 102 and the camera 103 in 3D space. In the image taken by camera there are the features $\phi_j$, which are the projections of the landmarks 102 as shown in FIG. 4. FIG. 5 shows the positions of the landmarks 102 in 3D coordinate systems. In one embodiment these positions are registered in the landmark map. Due to the error in the estimation of the 3D pose of the camera, the features which are the projections of the landmarks and the projection of the landmarks according to the camera model are not matching as shown in FIG. 6. For this reason, it is necessary to perform matching of the features and the landmark representations according to the invention. The mathematical framework may be explained as follows.

In one implementation, $x \in R^n$ represents the state of the camera. This includes, but may not be limited to, an arbitrary parametrization of the pose of the camera at the exact moment a certain frame is captured. Within the captured frame, N features are extracted, indexed by the index k (i.e. the set of features found in the image frame is $\{\phi_k\}_{k=1}^N$). Alongside the features, a landmark map is given containing the landmark representation of M landmarks. The representation of a landmark j is identified by the variable $z_j$. In some embodiments M is greater than N. For each feature $\phi_k$ there exists a control variable $u_k$ which can have a value from 1 to M and that indicates to which landmark feature $\phi_k$ is matched to. An update function is given, of the form $$x_k = f_k(x_{k-1}, u_k), k=1, \ldots, N$$

where $x_0$ is an "initial guess" or a priori estimate of the state of the camera at the moment the image was taken. This estimate may be provided by module 107 as shown in FIG. 1. Given a certain state and control variable, a stage cost is associated, calculated using the cost function:

$$g_k(x_k, u_k)$$

A policy is a sequence $$\pi_k = \{\mu_1, \ldots, \mu_k\}$$

of choices of $u_1, u_2, \ldots, u_k$. The length of a policy is indicated with the notation $|\pi_k|$. A policy is said to be a partial policy $\pi_k$ if its length is $|\pi_k| < N$. Conversely, a policy is said to be complete if it is a sequence of length N:

$$\pi = \{\mu_1, \ldots, \mu_N\}$$

A policy can be seen as a feature-to-landmark matches list. If the policy $\pi_k = \{\mu_1, \ldots, \mu_k\}$ is given, it means that feature 1 was matched with landmark representation $z_{\mu_1}$, feature 2 with landmark representation $z_{\mu_2}$ and so on.

A certain cost is associated with a policy:

$$J_{\pi_k}(x_0) = \sum_{j=1}^{k} g_j(x_j, \mu_j)$$

wherein the cost is additive. The total cost of a policy is the sum of the costs of all stages. A policy is said to be an optimal policy $\pi_k^*$ of length k if it minimizes the total cost among all the policies of the same length:

$$J_{\pi_k^*}(x_0) = J_k^*(x_0) = \min_{\pi_k} J_{\pi_k}(x_0)$$

A policy is said to be an optimal complete policy $\pi^*$ if it is a complete policy that minimizes the total cost among all complete policies:

$$J_{\pi^*}(x_0) = J^*(x_0) = \min_{\pi} J_{\pi}(x_0)$$

A state is associated with a policy through the function $F_{\pi_k}$, $F_{\pi_k}$ is obtained by repeatedly applying the update function:

$$x_{k+1} = F_{\pi_k}(x_0) = f_k(f_{k-1}(\ldots f_1(x_0, \mu_1) \ldots \mu_{k-1}), \mu_k)$$

In one embodiment, the cost function $g_k$ measures the negative log-likelihood of feature k to be the projection of landmark $u_k$, given that the pose of the camera is $x_k$.

The update function gives an updated estimate of the state of the camera if an additional feature-to-landmark matching is considered. In some embodiments, if the camera is believed to have state $x_{k-1}$, $x_k$ is the most plausible pose for the camera, when it is taken into account that feature k is the projection of landmark $u_k$. With this choice of $g_k$ and $f_k$, the optimal policy $\pi^*$ is the most plausible matching of features and landmarks, given the prior estimate of the camera pose $x_0$.

In some embodiments, the cost of a policy is the sum of the cost of all stages, plus an additional term, named $h(x_k)$, which is an heuristic function that estimates the cost of a policy from k+1 to N.

$$J_{\pi_k}(x_0) = \sum_{j=1}^{k} g_j(x_j, \mu_j) + h(x_k)$$

The optimal policy can be learned by efficiently exploring the space of policies. In one embodiment, this procedure prioritizes the exploration of the most promising policy, i.e. the one with the smallest partial cost. The procedure ends when the first complete policy is found.

The policies are stored in a dedicated data structure called a collection of the policies. In some embodiments, this data structure is optimized for fast retrieval of the policies having minimum cost among the policies in the collection of the policies.

In one embodiment, in the initialization phase of the procedure, an empty policy is added to the collection of the policies.

$$\pi_0 = \emptyset$$

This policy has zero cost, i.e. $J_{\pi_0} = 0$

The procedure then runs in a loop, and at each step it does the following:
1. Pick the policy having minimum cost among the policies in the collection of the policies. This is the policy with the minimum cost.
2. If $|\pi_k| = N$, stop the procedure. In other words, if the policy is a sequence of length N, then it is a complete policy, and the procedure is completed. This policy is the optimal complete policy. In some embodiments, a value K<N is used instead of N. That is, if the policy is a sequence of length K, the procedure is completed. In this case the policy $\pi_k$ is the optimal policy among the policies of length K.
3. Otherwise, create $M - |\pi_k|$ new policies and put them in the collection of the policies. Each one of the new policies matches feature k+1 with a different landmark that is not already in $\pi_k$. That is, each new policy is obtained by selecting a different $u_{k+1} \in [1, M] \backslash \pi_k$, i.e. $\pi_{k+1} = \pi_k \cup u_{k+1}$. In some embodiments $u_{k+1} \in L(x_k)$, wherein $L(x_k) \subseteq [1, M] \backslash \pi_k$. That is, new policies are created by matching feature k+1 with only some landmark representations in the landmark map.
4. For each new policy, calculate its cost, i.e.

$$J_{\pi_{k+1}} = J_{\pi_k} + g_{k+1}(F_{\pi_k}(x_0), u_{k+1})$$

5. Repeat from step 1.

In another implementation, a feature in the frame may not be the projection of any of the landmarks in the landmarks map. Such a feature is called an outlier feature. The procedure can be modified to account also for outlier features. The domain of the control variable is changed so that it includes the special value 0. If $u_k$ is zero, feature k is an outlier. Step three of the procedure is modified so that instead of selecting $u_k \in [1, M] \backslash \pi_k$, $u_k$ is chosen from $([1, M] \backslash \pi_k) \cup \{0\}$. Doing this ensures that each landmark appears at most once in a policy, but a policy can contain an arbitrary number of outliers. The update function, if k is an outlier, does not modify the state, i.e.:

$$f_k(x_k, 0) = x_k$$

In this example implementation, the cost function $g_k$ must provide, when $u_k=0$, the negative log-likelihood of feature k being an outlier.

The cost and the update function may be derived as follows. A probabilistic reasoning is used and the quantities of interest are treated as stochastic in nature. Namely, the state is interpreted as a random vector x:

$$x \sim \theta(x_k, P_k)$$

where $\theta$ is a certain distribution such that $E[x]=x_k$ and $cov(x,x)=P_k$. The feature $\phi_k$ is interpreted as a measurement of the projection of landmark $z_j$, affected by zero-mean measurement noise.

$$\phi_k = h_j(x) + w_k$$

The function $h_j(x)$ is part of the camera model, i.e. it models the 3D to 2D projection of landmarks to features performed by the camera.

$\phi_k$ is a random variable with mean $h_j(x_k)$. The covariance S of $\phi_k$ can be approximated with a first order Taylor expansion of $h_j$ at $x_k$:

$$S \approx H_j(x_k) P_k H_j(x_k)^T R_k$$

where $H_j$ is the Jacobian of the measurement function $h_j$ and $R_k$ is the covariance of $w_k$.

Given $\phi_k$, the squared Mahalanobis distance can be derived. The squared Mahalanobis distance is defined as:

$$d_j^2(x_k) = (\phi_k - h_j(x_k))^T S^{-1} (\phi_k - h_j(x_k))$$

It can be shown that if $\phi_k$ is normally distributed, $d^2$ is chi-squared distributed and it is proportional to the negative log likelihood of $\phi_k$.

In some implementations, the cost function is defined as:

$$g_k(x_k, u_k) = d_{u_k}^2(x_k)$$

If $g_k$ is defined as shown and $\phi_k$ is normally distributed, $g_k$ captures the likelihood of measurement $\phi_k$ given state $x_k$.

Following the same line of probabilistic reasoning from the previous section, the aim with the definition of the update function is to find a way of updating the expected value $x_k$ and covariance $P_k$ of x that maximally exploits the knowledge of $\phi_k$ being the projection of landmark $z_j$. It can be shown that, under certain assumptions, the optimal update of the expected value is:

$$x_{k+1} = x_k + K(\phi_k - h_j(x_k))$$

where the matrix K is defined as $$K = P_k H_j(x_k)^T S^{-1}$$

The updated covariance is:

$$P_{k+1} = (I - K H_j(x_k)) P_k$$

Thus, the update function $f$ is:

$$f_k(x_k, u_k) = x_k + P_k H_{u_k}(x_k)^T S^{-1} (\phi_k - h_{u_k}(x_k))$$

Figure 7:
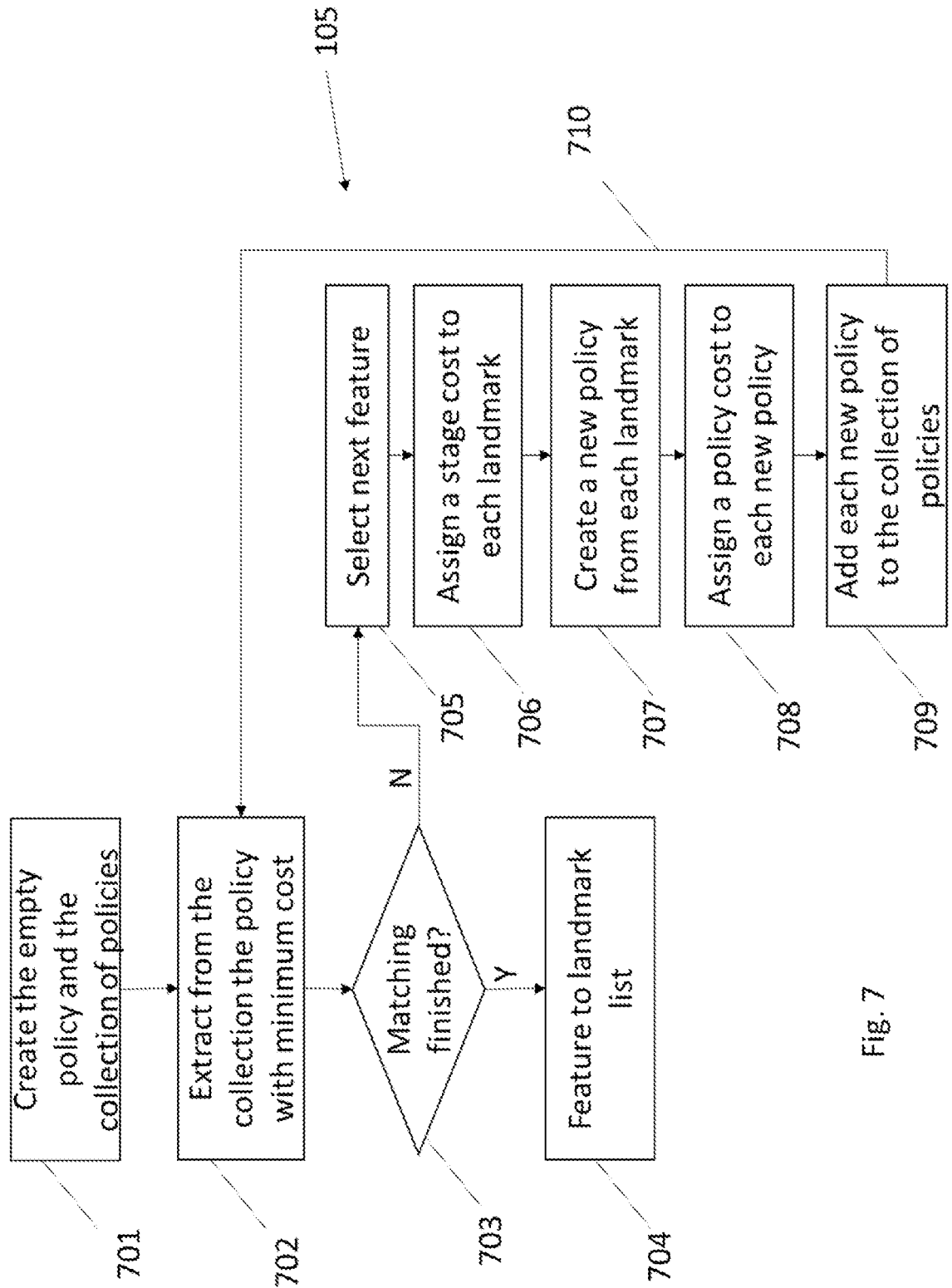
FIG. 7 is a flow chart illustrating the exemplary steps performed by the feature-to-landmark matching module, belonging to the assembly of FIG. 1, to create a list of feature-to-landmark matches.

FIG. 7 shows the exemplary steps performed by the feature-to-landmark matching module 105, belonging to the assembly of FIG. 1, to create a list of feature-to-landmark matches. the method comprises the following steps:

1. In step 701, an empty policy is added to the collection of the policies. This is an initialization step.
2. In step 702, the policy with minimum cost is extracted from the collection of the policies.
3. In step 703, test is performed to check if the matching process is finished.
4. If the matching process is finished, feature to landmark list is created in step 704, otherwise the next feature is selected in step 705.
5. In step 706, a stage cost is assigned to each of the landmark representations in the landmark map except to the landmark representations already in the policy of step 702, wherein the stage cost is a function of the 3D pose estimate.
6. In step 707, new policies are created by expanding the policy selected in step 702. Each new policy matches the feature selected in step 705 to each of the landmark representations from the landmark map except to the landmark representations already in the policy of step 702.
7. In step 708, a policy cost is assigned for every new policy, wherein the policy cost is the sum of the policy cost of the policy of step 702 and the stage cost of step 706.
8. In step 709, each new policy is added to the collection of the policies.
9. In step 710, the process is resumed from step 702.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method for matching features in an image with landmark representations in a landmark map, the method comprising:
   providing a 3D pose estimate of a camera;
   providing at least one image which was captured by the camera at a camera location;
   extracting from the image at least two features which are projections of landmarks which are visually indistinguishable in the image;
   selecting a feature from said extracted at least two features;
   providing a landmark map comprising a list of landmark representations, wherein each landmark representation is a representation of a respective physical landmark;
   creating a plurality of policies, each policy comprising at least one matching decision of the feature and the landmark representation, each matching decision having a stage cost wherein the stage cost is a function of the 3D pose estimate so that matching finds the most likely match between features and landmarks, whose projections are visually indistinguishable in the image, given a prior estimate of the pose;
   assigning a policy cost to each of the policies, wherein the policy cost is a function of the stage costs of the matching decisions the policy is comprised of;
   selecting from the plurality of the policies the policy with desired policy cost and use feature-to-landmark matches which are listed in the selected policy to identify the camera location;
and wherein the method further comprises updating the 3D pose estimate after at least one matching decision.

2. The method of claim 1 further comprising the steps of: creating a collection of policies comprising all the policies.

3. The method of claim 1, wherein the desired policy cost is the smallest policy cost.

4. The method of claim 1, further comprising the steps of:
a) if no additional feature is to be matched then finish the matching process;
b) if at least one additional feature is to be matched then select the next feature and remove the policy with the lowest policy cost from the collection of the policies and create at least one new policy by adding one matching decision to the policy with the lowest policy cost;
c) assigning the policy cost to each new policy;
d) adding each new policy to the collection of policies;
e) selecting from the collection of the policies the policy with the smallest policy cost.

5. The method according to claim 1 wherein providing at least one image comprises capturing the image with the camera.

6. The method according to claim 4, wherein creating of at least one new policy by adding one matching decision to the policy with the lowest policy cost comprises creating the new policy from each of the landmark representations from the landmark map except to the landmark representation already in the policy.

7. The method according to claim 4, further comprising repeating the steps a) to e) of claim 4 until all the features are matched or until a predefined number of features are matched.

8. The method according to claim 1, further comprising the step of creating a feature-to-landmark list.

9. The method according to claim 1, wherein the stage cost is calculated using a cost function which is a function of a control variable having a value from 1 to M, wherein M is number of landmark representation in the landmark map.

10. The method according to claim 9, wherein the cost function measures the negative log-likelihood of the feature to be the projection of landmark.

11. The method of claim 1, wherein the 3D pose estimate is updated after at least one matching decision.

12. The method according to claim 1, wherein a landmark representation is not in the landmark map.

13. The method according to claim 12, wherein the stage cost of a landmark representation not in the landmark map measures the negative log-likelihood of the feature being an outlier.

14. The method according to claim 1, wherein the number of landmarks considered for matching is lower than total number of landmark representations in the landmark map.

15. The method according to claim 1, wherein the policy cost is a sum of the stage costs of the matched landmark representations and a heuristic of the cost to match the features not matched in the policy.

16. The method according to claim 1, wherein the landmark representation comprises an estimate of the position of the landmark and/or a 3D position of the landmark expressed in the external coordinate frame.

17. The method according to claim 1 wherein the landmark representation comprises at least one of: uncertainty metric in the estimate of the position of the landmark, one or more descriptions of the shape of the landmark, size or dimensions of the landmark, orientation of the landmark, reflective properties of the landmark, a list of distinctive 3D positions of the landmark, one or more semantic classification of the landmark.

18. The method according to claim 1, wherein the step of feature extraction from the image comprises applying a filter and identifying local maxima.

19. The method according to claim 1, wherein the landmarks are passive landmarks wherein a passive landmark is a landmark that reflects light.

20. The method according to claim 1, further comprising the step of creating an empty policy before creating the pluralities of policies.

21. A system comprising,
a plurality of physical landmarks each of which is configured to reflect light;
the camera which is operable to capture one or more frames each of which comprises a respective image of one or more physical landmarks, to provide one or more images which contain one or more features that correspond to the said physical landmarks;
one or more processors which are configured to carry out the method according to claim 1.

22. The system according to claim 21 further comprising a light source.

23. A non-transitory computer readable medium including executable instructions which, when executed in a processing system, causes the processing system to perform the steps of a method according to claim 1.

24. The method of claim 1 wherein the matching find the most likely match between features and landmarks, whose projections are visually indistinguishable in the image, using a prior estimate of the pose without relying on feature descriptors.

25. The method of claim 1 wherein the matching finds the most likely match between features and landmarks, whose projections are visually indistinguishable in the image, using the prior estimate of the pose and feature descriptors.

26. A method for matching features in an image with landmark representations in a landmark map, the method comprising:
providing at least one image which was captured by a camera at a camera location;
extracting from the image one or more features;
providing a landmark map comprising a list of landmark representations, wherein each landmark representation is a representation of a respective physical landmark;
creating a plurality of policies, each policy comprising at least one matching decision of the feature and the landmark representation, each matching decision having a stage cost;
assigning a policy cost to each of the policies, wherein the policy cost is a function of the stage costs of the matching decisions the policy is comprised of;
selecting from the plurality of the policies the policy with desired policy cost and use feature-to-landmark matches which are listed in the selected policy to identify the camera location; and wherein the method further comprises the steps of:
a) if no additional feature is to be matched then finish the matching process;
b) if at least one additional feature is to be matched then select the next feature and remove the policy with the lowest policy cost from the collection of the policies and create at least one new policy by adding one matching decision to the policy with the lowest policy cost;
c) assigning the policy cost to each new policy;
d) adding each new policy to the collection of policies;
e) selecting from the collection of the policies the policy with the smallest policy cost and use feature-to-landmark matches which are listed in the selected policy to identify the camera location.

* * * * *